US012246629B2

(12) United States Patent
Frank et al.

(10) Patent No.: US 12,246,629 B2
(45) Date of Patent: Mar. 11, 2025

(54) CHILD SAFETY SEAT ROTATABLY MOUNTED ON A BASE

(71) Applicant: Britax Römer Kindersicherheit GmbH, Leipheim (DE)

(72) Inventors: Richard Frank, Elchingen (DE); Bernd Häußler, Ulm (DE); Richard Henseler, Ulm (DE)

(73) Assignee: Britax Römer Kindersicherheit GmbH, Leipheim (DE)

( * ) Notice: Subject to any disclaimer, the term of this patent is extended or adjusted under 35 U.S.C. 154(b) by 208 days.

(21) Appl. No.: 18/093,036

(22) Filed: Jan. 4, 2023

(65) Prior Publication Data

US 2023/0226957 A1    Jul. 20, 2023

(30) Foreign Application Priority Data

Jan. 17, 2022    (AU) ................................ 2022200286

(51) Int. Cl.
*B60N 2/28*    (2006.01)
(52) U.S. Cl.
CPC ......... *B60N 2/2869* (2013.01); *B60N 2/2821* (2013.01); *B60N 2/2845* (2013.01)
(58) Field of Classification Search
CPC ............................ B60N 2/2821; B60N 2/2869
See application file for complete search history.

(56) References Cited

U.S. PATENT DOCUMENTS

| 7,338,122 B2 | 3/2008 | Hei |
| 7,478,877 B2 | 1/2009 | Lhomme et al. |
| 11,420,540 B2 | 8/2022 | Williams |
| 11,584,267 B2 | 2/2023 | Longenecker |
| 11,878,609 B2 | 1/2024 | Williams |

(Continued)

FOREIGN PATENT DOCUMENTS

| CN | 104290619 A | 1/2015 |
| EP | 1974988 B1 | 8/2012 |

(Continued)

OTHER PUBLICATIONS

Examination Report No. 1, Issued Date: Mar. 8, 2022, pp. 1-4, Australian Patent Application No. 2022200286.

(Continued)

*Primary Examiner* — David R Dunn
*Assistant Examiner* — Tania Abraham
(74) *Attorney, Agent, or Firm* — K&L Gates LLP

(57) ABSTRACT

A child safety seat and base assembly wherein a base is arranged to be secured with respect to a motor vehicle and a seat is arranged to be removably secured is disclosed. The assembly includes: a rotary element rotatably mounted to the base; a seat latch on the rotary element that engages the child safety seat to releasably hold the child safety seat to the base and rotary element; a seat latch actuation assembly for opening or closing the seat latch wherein opening the seat latch releases the child safety seat; and an interlock mechanism actuated upon opening the seat latch that prevents rotation of the rotary element with respect to the base. The seat latch actuation assembly may include a slidably mounted handle, wherein in use, the base blocks access to the handle when the seat is in any position other than one or two side-loading position(s).

10 Claims, 22 Drawing Sheets

(56) References Cited

U.S. PATENT DOCUMENTS

| | | |
|---|---|---|
| 11,884,188 B2 | 1/2024 | Brunick |
| 12,005,817 B2 | 6/2024 | Keegan |
| 12,059,985 B2 | 8/2024 | Williams |
| 2001/0004162 A1 | 6/2001 | Yamazaki |
| 2002/0163232 A1* | 11/2002 | Vezinet ................ B60N 2/2845 |
| | | 297/183.2 |
| 2010/0207436 A1 | 8/2010 | Karremans et al. |
| 2015/0296987 A1 | 10/2015 | Hondros et al. |
| 2019/0084449 A1 | 3/2019 | Cohen et al. |
| 2021/0237626 A1* | 8/2021 | Longenecker ....... B60N 2/2806 |
| 2022/0048415 A1* | 2/2022 | Keegan ................ B60N 2/2875 |
| 2023/0068575 A1 | 3/2023 | Keegan |
| 2024/0083312 A1 | 3/2024 | Wei |
| 2024/0149759 A1 | 5/2024 | Brunick |

FOREIGN PATENT DOCUMENTS

| | | |
|---|---|---|
| EP | 3798049 A1 | 3/2021 |
| WO | WO 2011029951 A1 | 3/2011 |
| WO | WO2023222920 A2 | 11/2023 |

OTHER PUBLICATIONS

Search Information Statement, Search Completion Date: Mar. 1, 2022, pp. 1-3, Australian Patent Application No. 2022200286.

* cited by examiner

CHILD SAFETY SEAT ROTATABLY MOUNTED ON A BASE

CROSS-REFERENCE TO RELATED APPLICATIONS

The instant application claims priority to Australian Patent Application Number 2022-200286, entitled "A CHILD SAFETY SEAT ROTATABLY MOUNTED ON A BASE" and filed Jan. 17, 2022, the disclosure of which is hereby incorporated by reference in its entirety.

TECHNICAL FIELD

The invention relates to a child safety seat mounted to a base where the child safety seat can rotate with respect to the base.

BACKGROUND

The child safety seat and base can be secured to a motor vehicle's seat for the carriage of a child in the vehicle. A means of controlling the rotation of the seat with respect to the base as well as a means of removing and locking the child safety seat to the base are disclosed.

Examples of child safety seats that can be rotated with respect to a base are known. With some examples where the base is secured to a motor vehicle's seat, the child safety seat can be rotated with respect to the base to move the seat between in-use positions in either a forward or rear facing position. This allows the seat to be at a side loading position, 90 degrees with respect to either in-use position, to allow easy seating or extraction of a child from a doorway of a motor vehicle.

It is useful to allow a child safety seat to be released from the base to, for example, attach the seat to a stroller. This can be achieved with a base that has a rotary element mounted for rotary movement in the base. The rotary element has latches on its upper surface to which the child safety seat affixes and the child safety seat has latching elements that engage with the rotary element latches. The latches securely hold the seat and are sufficiently strong to withstand loads applied during vehicle impact conditions.

A means of securing a separable child seat to the rotary element of the base in the correct position is desirable and any system that does not ensure the correct orientation may lead to unsafe outcomes.

It is against this background that the present disclosure has been developed.

SUMMARY

According to a first aspect, there is provided a child safety seat and a base wherein the base is arranged to be secured with respect to a motor vehicle, comprising: a rotary element rotatably mounted to the base, a latch on the rotary element that engages the child safety seat to releasably hold the child safety seat with respect to the base and rotary element, means for opening or closing the latch wherein opening the latch releases the child safety seat, and an interlock means actuated upon opening the latch that prevents rotation of the rotary element with respect to the base.

The rotary element may be configured to latch with respect to the base so as to position the child safety seat in one or more in-use positions. These include a rear facing and a forward facing position. Manual means may be provided to release the latch between the base and the rotary element to allow rotation of the child safety seat with respect to the base.

The rotary element is arranged to rotate so that the child safety seat may be repositioned with respect to the base and vehicle seat to move the child safety seat to a position where it is easier or more convenient to position a child into the safety seat or to remove the child. This may include rotating the seat so that it is aligned with an open vehicle door.

Rotation of the rotary element will also position the child safety seat for removal from the base by operation of the latch. The latch may include a plurality of hooks mounted to the rotary element that move between a latching position and an unlatched position. The child safety seat may have latch engaging elements such as pins or similar elements over which the hooks may engage. The hooks may comprise a simple right-angled hook that works in conjunction with a vertical abutment or notch on the rotary element. Both act to prevent movement of the latch engaging elements once the hook is over it. The hook will prevent upward movement and horizontal movement towards the hook and the vertical abutment will prevent horizontal movement in the opposite direction.

In a second aspect of the invention, the child safety seat is rotated from an in-use position to a second predetermined position where operation of the latch will also allow actuation of the interlock means which will act to hold the rotary element at that predetermined position. Operation of the interlock means prevents the rotary element from moving away from the pre-determined position once the child safety seat is removed.

Further, the interlock means may prevent operation of the latch to release the lock means once the child safety seat is removed from the rotary base. In this way, the rotary base is prevented from moving from the position where the child safety seat is removed from the base and the rotary element cannot be moved from this position while the child safety seat is removed.

The interlock means is released once the child safety seat is positioned onto the rotary element with its latch engagement elements aligned with the latch. One or more of the latch elements may depress spring loaded actuating elements that then enables the rotary element to rotate with respect to the base once the child safety seat is in position to be re-latched to the rotary element.

Further, the latch may be designed to be disabled or non-operable when the child safety seat is in an in-use position. That is, the operation of the latch to release the child safety seat is not possible when it is in position for carriage of a child while the vehicle is moving. This prevents inadvertent release of the child safety seat when it is in one of its in-use positions.

According to a second aspect, there is provided a child safety seat and base assembly wherein a base is arranged to be secured with respect to a motor vehicle and a seat is arranged to be removably secured with respect to the base, the assembly including a rotary element rotatably mounted to the base; a seat latch on the rotary element that engages the child safety seat to releasably hold the child safety seat with respect to the base and rotary element; a seat latch actuation assembly for opening or closing the seat latch wherein opening the seat latch releases the child safety seat; and an interlock mechanism actuated upon opening the seat latch that prevents rotation of the rotary element with respect to the base.

In one form, the seat latch actuation assembly includes a handle slidably mounted with respect to the rotary element.

In one form, in use, the base blocks access to the handle when the seat is in any position other than one or two side-loading position(s), thereby preventing opening or closing the seat latch when the seat is in any position other than the one or two side-loading position(s).

In one form, the child safety seat and a base further includes a plurality of hooks and hook-engagable projections, the hooks movable from a latching position in which they hold the hook-engagable projections, to a released position in which they do not hold the projections.

In one form, the hooks are located on the rotary element and form part of the seat latch and the hook-engagable projections are located on the seat.

In one form, the interlock mechanism includes a locking projection and a locking recess, the locking projection engagable with the locking recess to prevent rotation of the rotary element with respect to the base when the seat latch is opened.

In one form, the locking projection extends from the rotary element and the locking recess is formed in the base.

In one form, the rotary element includes a depressible element engagable by a seat-depending surface, whereby the depressible element is depressible by the seat-depending surface to release the interlock mechanism.

In one form, the depressible element includes an interlock pin, the interlock pin biased toward an upper position in which the interlock mechanism locks, thereby preventing rotation of the rotary element with respect to the base.

In one form, the interlock mechanism includes an interlock latch, the interlock latch actuated by the interlock pin.

In one form, the interlock latch is biased towards an upper position in which an end face of the interlock latch blocks movement of the handle, thereby preventing deactivation of the interlock mechanism until the interlock pin is depressed.

In one form, the interlock latch is pivotally mounted to the rotary element.

BRIEF DESCRIPTION OF DRAWINGS

Embodiments of the present invention will be discussed with reference to the accompanying drawings wherein.

DESCRIPTION OF EMBODIMENTS

Figure 1:
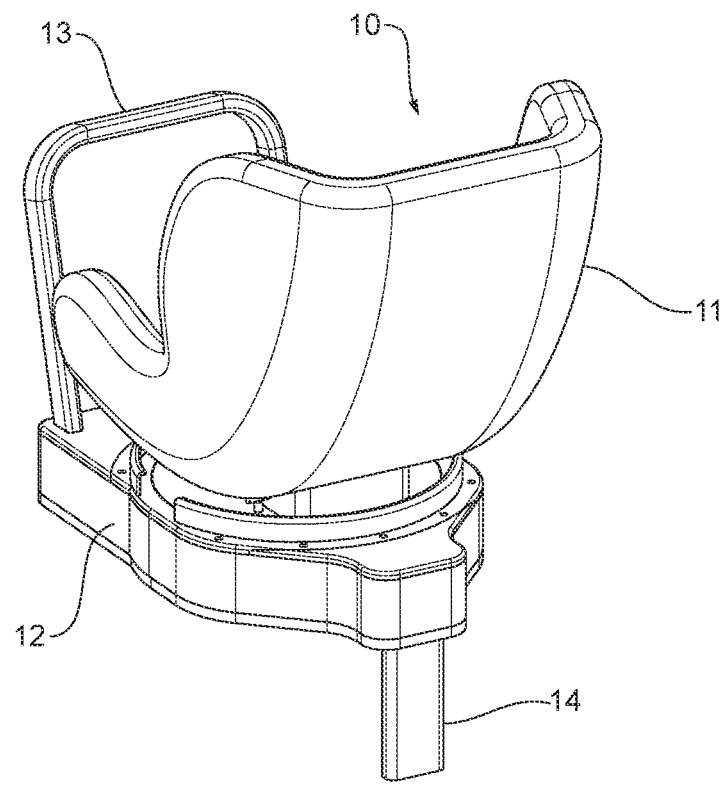
FIGS. 1 and 2 show perspective views of a child safety seat and base with the child seat in an in-use rear facing orientation.
Figure 2:
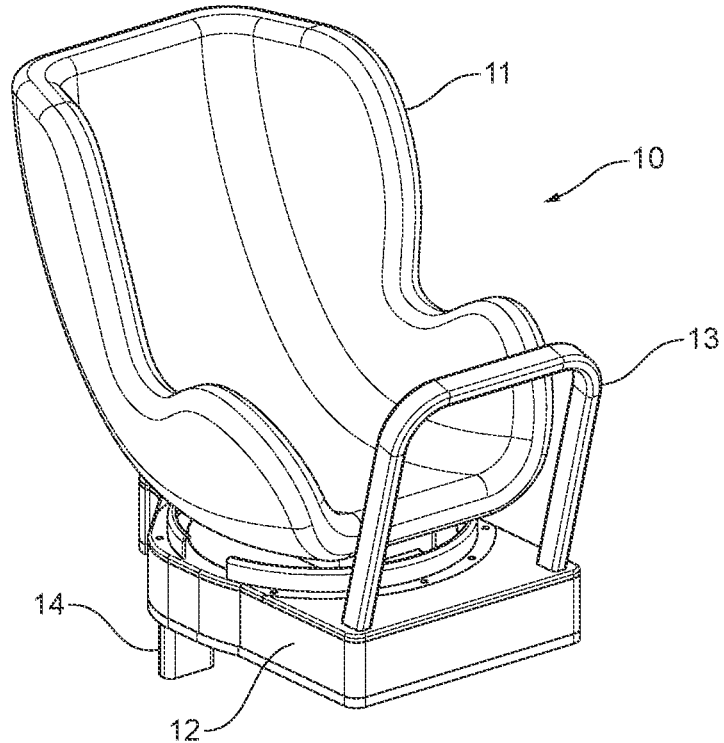
Figure 3:
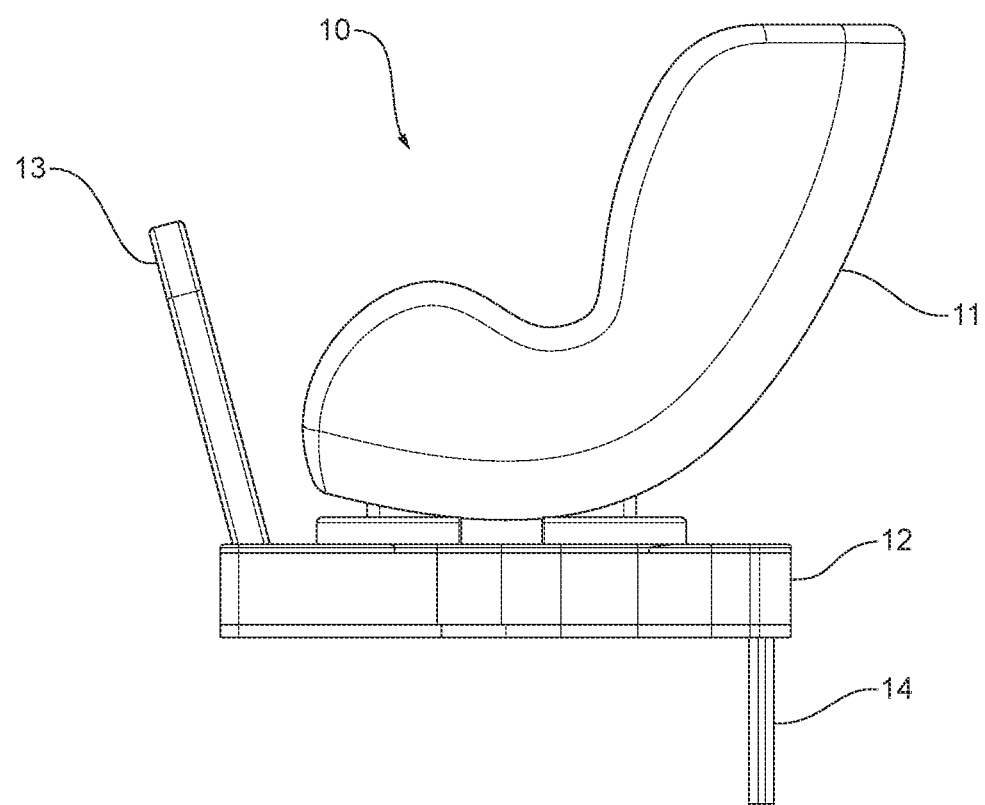
FIG. 3 shows a side view of a child safety seat and base with the child seat in an in-use rear facing orientation.

Referring to FIGS. 1, 2 and 3, a child safety seat and base 10 comprises a child seat 11 secured to the base 12. The base 12 is designed to locate on and secure to the seat portion of a motor vehicle seat and optionally has a rebound bar 13 that abuts against the backrest of the vehicle seat and, again optionally, a foot prop 14 (partially shown in FIGS. 1 and 2) to restrain rear and forward rotation respectively of the child seat 11 and base 12. Isofix connectors (not drawn) connect and secure the base 12 with respect to the vehicle seat. In other arrangements, not shown, the child safety seat and base 10 may be arranged and constructed for belted installation using a motor vehicle's seat belts and a top tether or a foot prop for example. In further arrangements, not shown, the child safety seat and base 10 may be arranged and constructed for installation by means of a latch system commonly used in the United States.

As seen in FIGS. 1 to 3, the child seat 11 is in a rear facing in-use position. That is, the child will be facing the rear of the vehicle which is a position recommended for infants, babies and very young children.

Figure 4A:
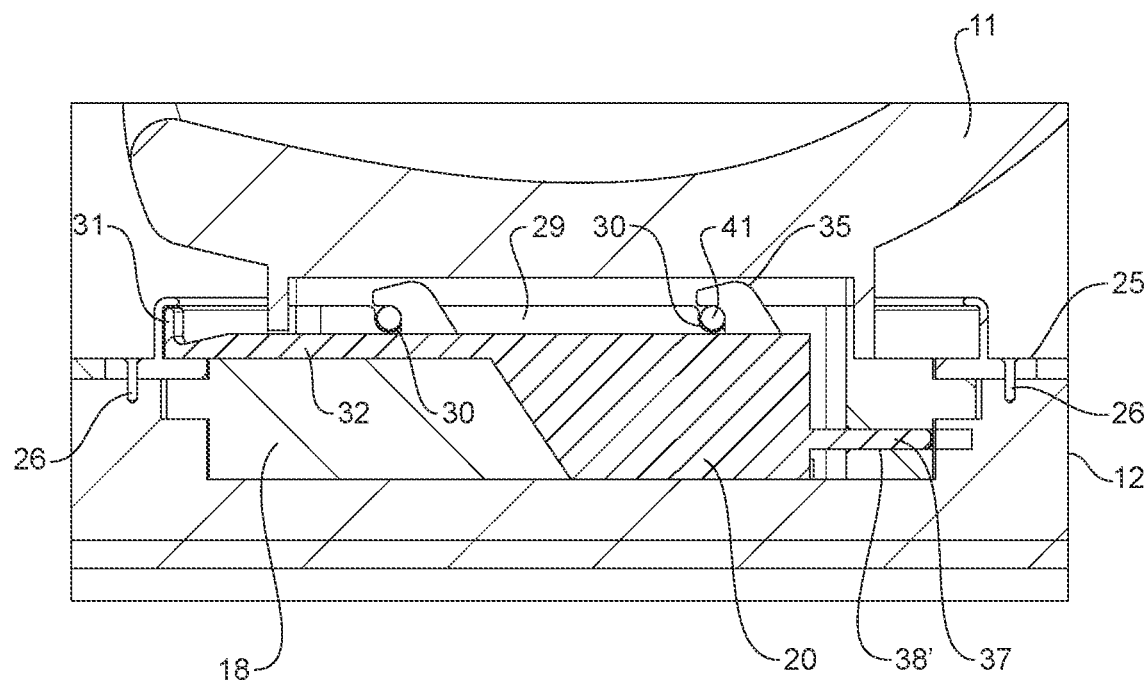
FIG. 4A shows a part cross section view of the base, rotary element, latch and child seat in a latched position.

With the base 12 remaining in a fixed position with respect to a vehicle seat, the child seat 11 is able to rotate through 360 degrees. As seen in FIG. 4A, the child seat 11 is secured to a rotary element 18 and together, the child seat 11 and rotary element 18 are able to rotate about a substantially vertical axis on the base 12.

A seat latch acts with the rotary element 18 and the base 12 to hold the child seat 11 in one of two in-use positions, either rear facing as shown in FIGS. 1 to 3 or forward facing. The seat latch may be manually operated, using a handle 31, and once released, the child seat 11 can be rotated to the opposite in-use position or to pre-determined intermediate positions. The intermediate positions are preferably 90 degrees from the in-use positions in either a clockwise or anticlockwise direction. This will have the advantage of positioning the child seat 11 towards the open door of a motor vehicle.

Figure 4B:
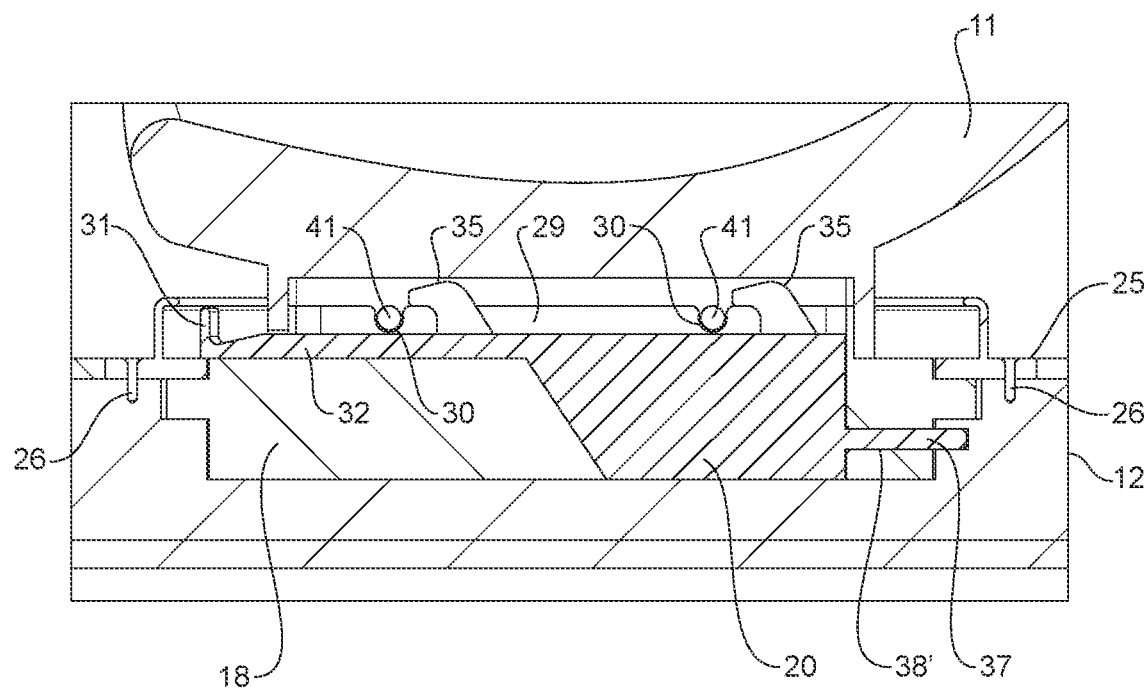
FIG. 4B shows a part cross section view of the base, rotary element, latch and child seat in an unlatched position.

The rotary element 18 is provided with a seat latch which includes a seat latch body 20 as seen in FIGS. 4A and 4B. The seat latch body 20 slides within the rotary element 18 as will be described in detail below. The seat latch body 20 is manually operated between a latched and unlatched position.

Figure 5:
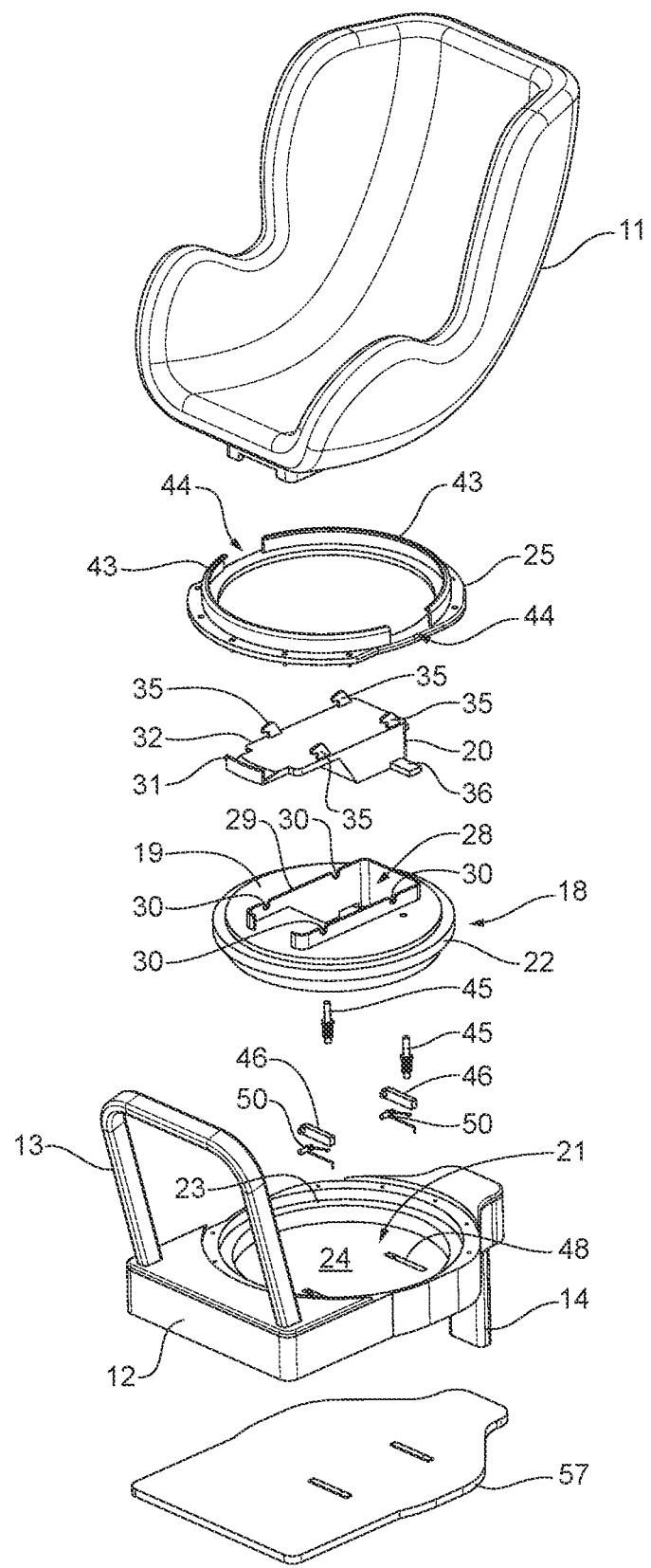
FIG. 5 shows an exploded view from above (upper exploded view) of the components comprising the child safety seat and base.
Figure 6:
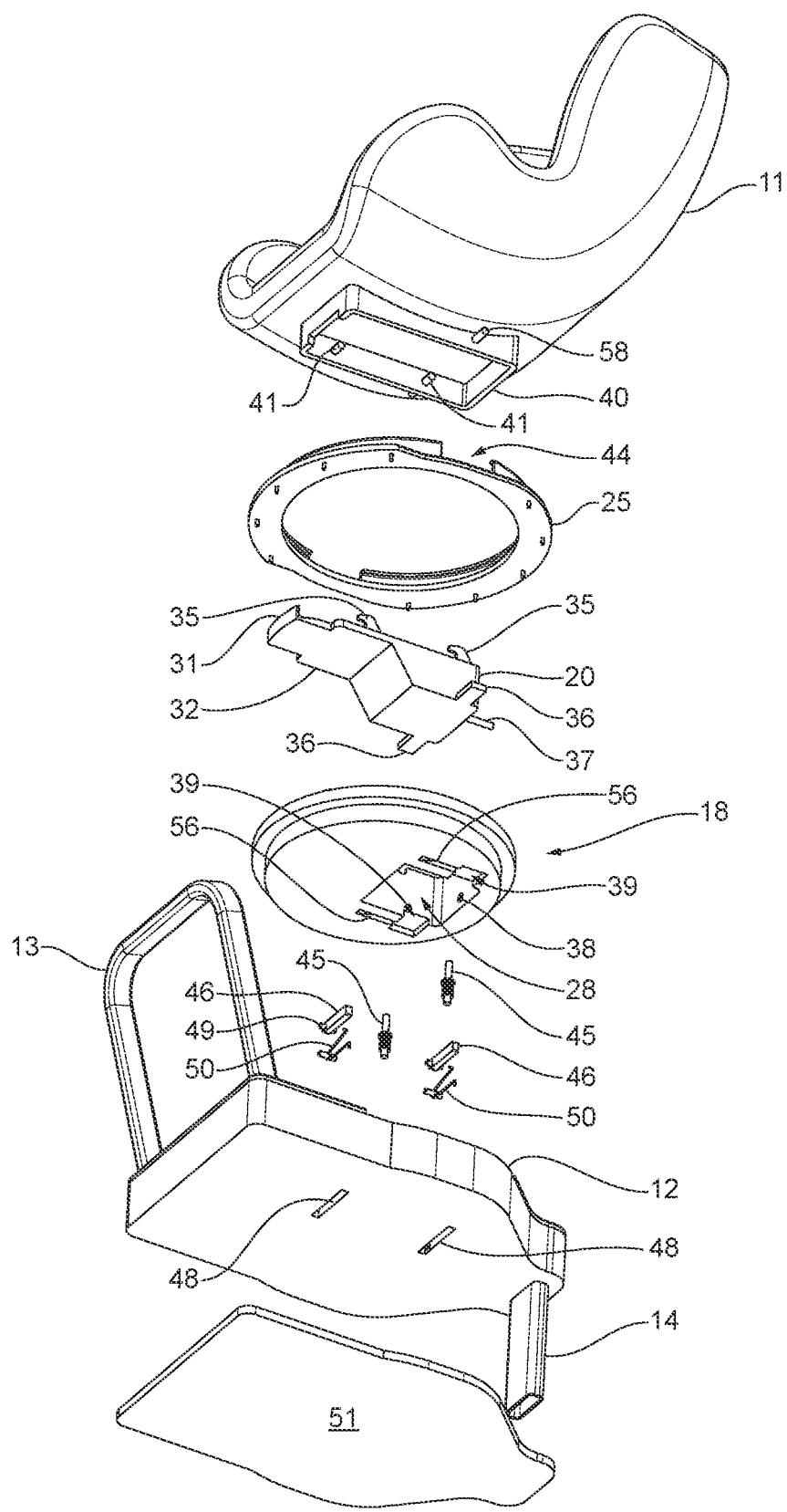
FIG. 6 shows an exploded view from below (lower exploded view) of the components comprising the child safety seat and base.

Referring to FIGS. 5 and 6, the rotary element 18 comprises a generally circular disc that locates into a complimentary shaped cavity 21 in the base 12. The cavity 21 has a floor 24. The rotary element 18 has a peripheral flange 22 that sits on a bearing surface 23 on the base 12, as is shown in FIG. 5, and the rotary element 18 is held captive in the cavity 21 by a retainer 25 that has threaded fasteners 26 that secure it to the base 12.

The rotary element 18 has a cavity 28 within which the latch body 20 locates. Positioned around the cavity 28 is a U-shaped rim 29 located on the upper surface 19 of the rotary element 18. The rim 29 has a number of notches 30 spaced around its periphery.

The seat latch body 20 has an upturned handle 31 at the end of a plate 32 that extends from the seat latch body 20. Hooks 35 are located on the upper surface of both the plate 32 and the latch body 20. Lugs 36 extend laterally from the seat latch body 20 at the lower edge of the seat latch body 20. A locking projection in the form of a pin 37, shown in FIGS. 4 and 6, extends from an end of the seat latch body 20.

The seat latch body 20 is located within the cavity 28 by inserting the handle 31 through the cavity 28 from the underside of the rotary element 18. Preferably, there is sufficient play within the cavity 28 or flexibility of some, or all, of the interlocking parts for the seat latch body 20 to be positioned to allow the pin 37 to locate into a locking recess in the form of an aperture 38. Alternatively, there may be provided a removable cover that allows the pin 37 to locate into the aperture 38.

The lugs 36 locate in cavities 39 on the underside surface of the rotary element 18 as is shown in FIG. 6. The cavities 39 allow back and forth movement of the lugs 36 as the seat latch body 20 is moved between its latched and unlatched positions of FIGS. 4A and 4B respectively. The combination of the pin 37 and the lugs 36 slidably retain the latch body 20 in the cavity 28 of the rotary element 18.

Referring to FIG. 6, the under surface of the seat 11 has a box 40 having a generally rectangular peripheral wall which is sized to locate over the rim 29. Hook-engagable projections in the form of pins 41 are located on the inner wall of the box 40 and align with the notches 30 of the rim 29. As can be seen in FIG. 4A, with the pins 41 located in the notches 30 the seat is held to the rotary element 18 with the hooks 35 positioned over the pins 41.

Figure 7:
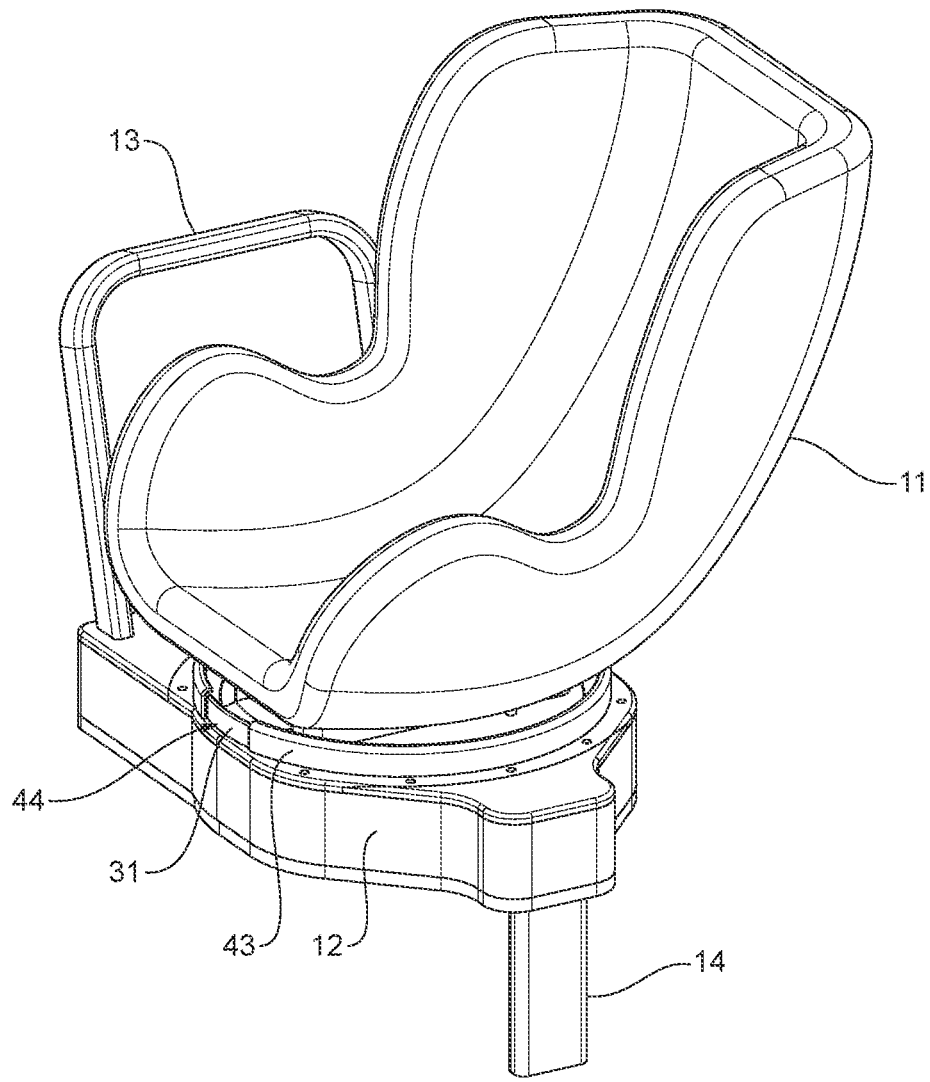
FIG. 7 shows the child seat rotated 90 degrees from the rear facing in-use position.

FIG. 7 shows the child seat 11 rotated 90 degrees from the position shown in FIGS. 1 to 3. A manual latch (not shown) is actuated to allow the child seat 11 to move from its in-use position. The retainer 25 has a flange 43 that extends around the retainer 25. The flange 43 has two openings 44 positioned 90 degrees from the in-use positions. The flange 43 prevents access to the handle 31 in all but the 90 degree positions. However, the openings 44 allow access to the handle 31 when the child seat 11 is rotated to this predetermined position.

As seen in FIG. 4A, the end of the pin 37 abuts against the wall of the cavity 21 below the bearing surface 23, aside from when it aligns with an aperture 38 that is provided at two diametrically opposite loading positions. This prevents unlatching movement of the latching body 20. As the seat 11 and rotary element are rotated, the latch body moves with them both. When they are rotated 90 degrees to the predetermined position, the pin 37 aligns with an aperture 38 in the wall of the cavity 21 as is shown in FIG. 4B. In this position, the handle 31 is accessible and can now be pushed inwardly. The pin 37, sliding within through-hole 38', can enter the aperture 38 and the latch body is moved so that the hooks 35 are clear of the pins 41. In this position, the seat 11 is unlatched and can be removed from the base 12.

Engagement of the pin 37 in the aperture 38 will allow the latch body 20 to move into a position that is open and the seat 11 can be removed. However, base 12 can be arranged to prevent the latch body 20 moving back to a closed position and to prevent the rotary element rotating while the seat 11 is removed.

Figure 9:
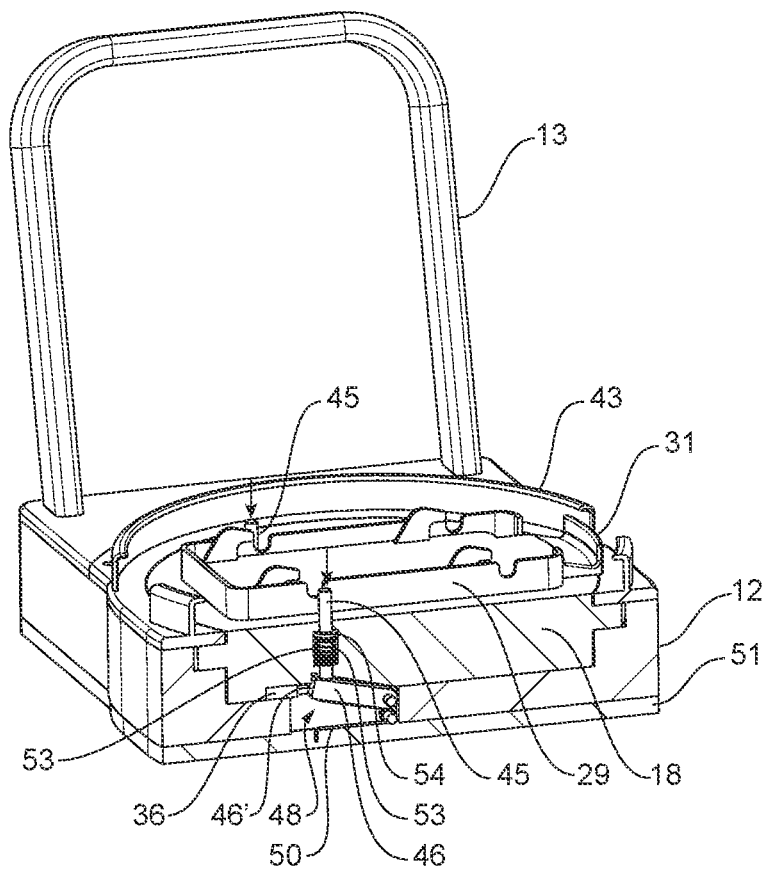
FIGS. 9 and 10 show a cross section view of FIG. 8.
Figure 10:
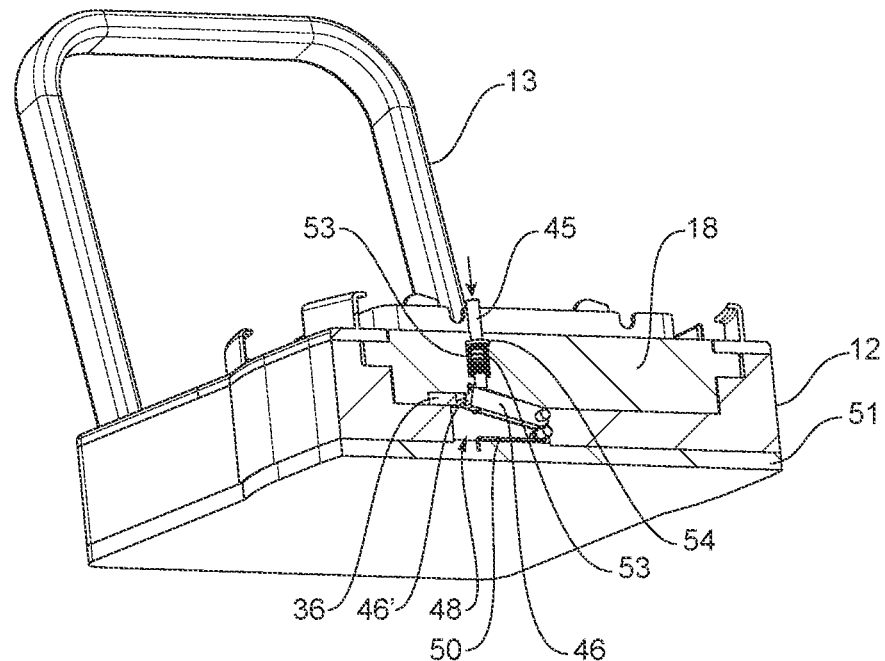
Figure 11:
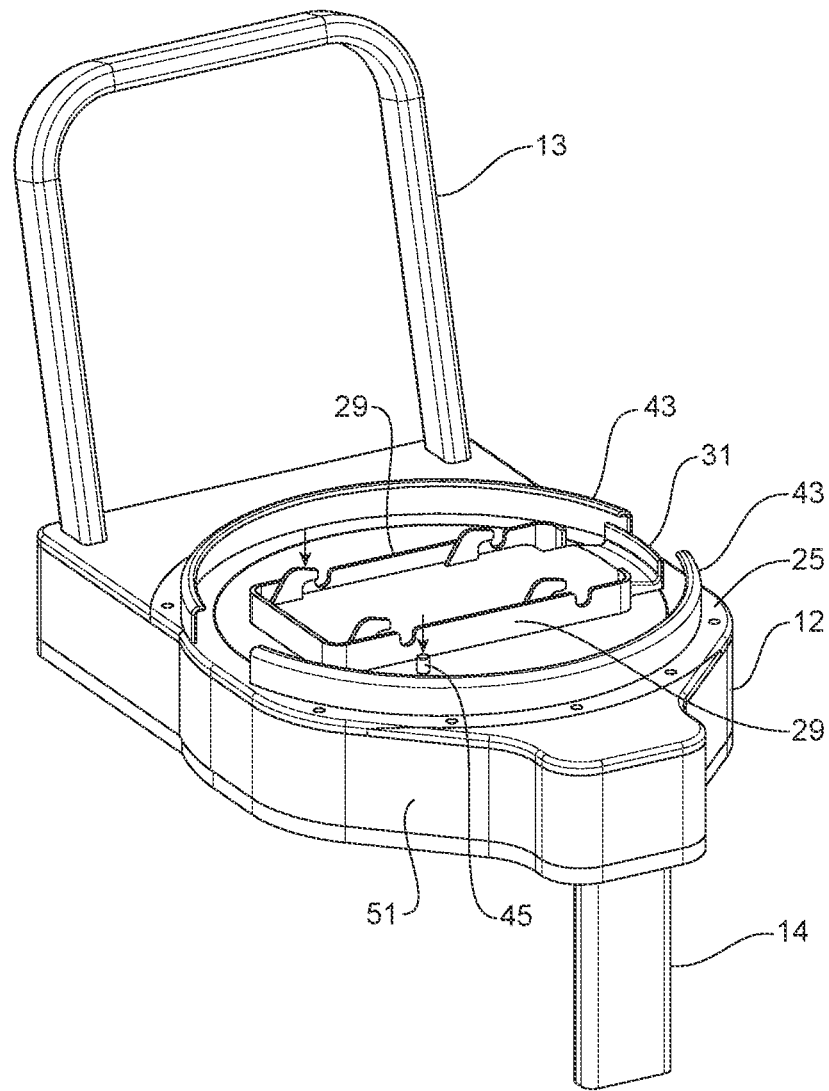
FIG. 11 shows operation of the actuating pins in a downward direction.

An interlock is provided which comprises spring loaded actuating pins 45 and spring loaded interlock latches in the form of latch bars 46. As seen in FIGS. 9 and 10, the latch bars 46 are mounted in slots 48 in the floor 24 of the cavity 21. The latch bars 46 have pivot pins 49 that engage apertures in the slots 48. This allows upward pivoting movement of the latch bars 46 within the slots 48. The latch bars 46 are biased upwardly by springs 50 that are held in place below the latch bars 46 by a base plate 51. The springs 50 may have pivot pins that also engage pivot holes in the slots 48 and have hooks at their ends that engage retaining holes in both the latch bar 46 and the base 51.

In this manner, the latch bars 46 are held in the floor 24 of the cavity 21 with the base of the rotary element 18 moving over them as it rotates.

Figure 8:
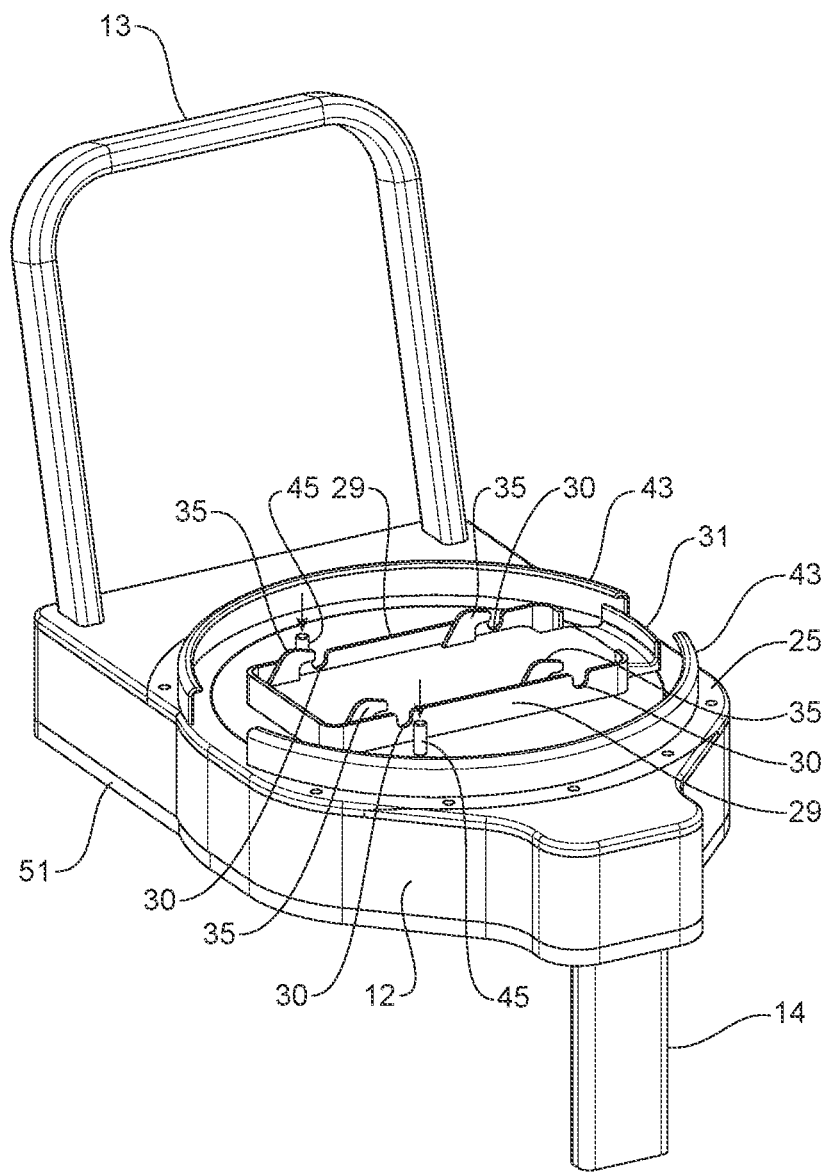
FIG. 8 shows the base with the child seat removed with actuating pins in their upper position.

The actuating pins 45 are mounted in the rotary element and move with it as it is rotated. As seen in FIG. 8, with the seat 11 removed the actuating pins 45 are urged upwardly by springs 52. As seen in FIGS. 9 and 10, the actuating pins 45 with springs 52 are mounted in a bore 53. The actuating pins have collars 54 against which the springs 52 act to push the actuating pin 45 upwardly into the position shown in FIGS. 8 to 10.

When the rotary element 18 is aligned in its 90 degree position, the latch body 20 can be moved to the unlatch position where the seat 11 can be removed. This is the position shown in FIGS. 9 and 10. In this position, slots 56 in the base of the rotary element 18 (see FIG. 6) align with the latch bars 46. The upward biasing of the springs 50 results in the latch bars 46 pivoting upwardly so that their ends locate into the slots 56 shown on FIG. 6.

With the latch bars 46 in the slots 56, the rotary element 18 is fixed in position and cannot rotate away from the position from where the seat 11 was removed. Also, the ends 46' of latch bar 46 block movement of the lugs 36 and so in this position, the latch body 20 cannot be moved away from the unlatched position as is illustrated in FIGS. 9 and 10.

This prevents the rotary element 18 from moving out of position once the seat is removed.

Figure 12:
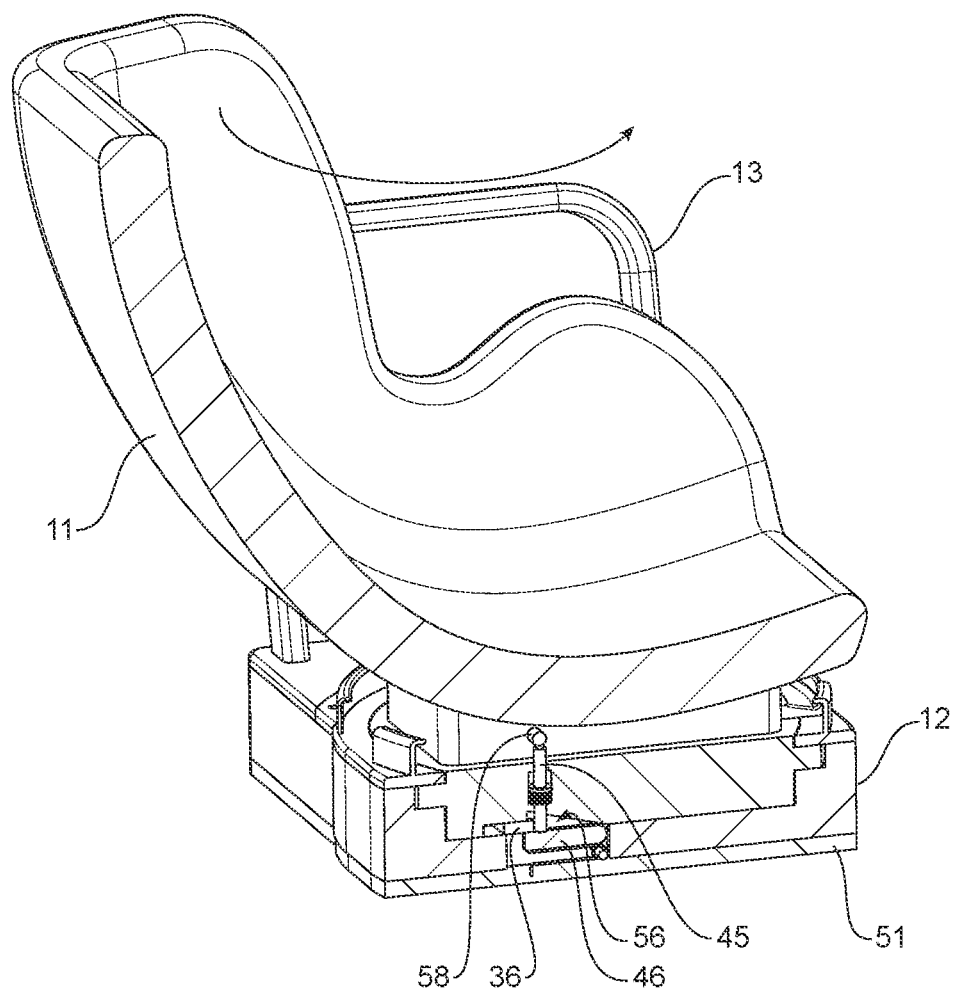
FIG. 12 shows pins on the child seat pushing the actuating pins down as the seat is replaced on the base.
Figure 13:
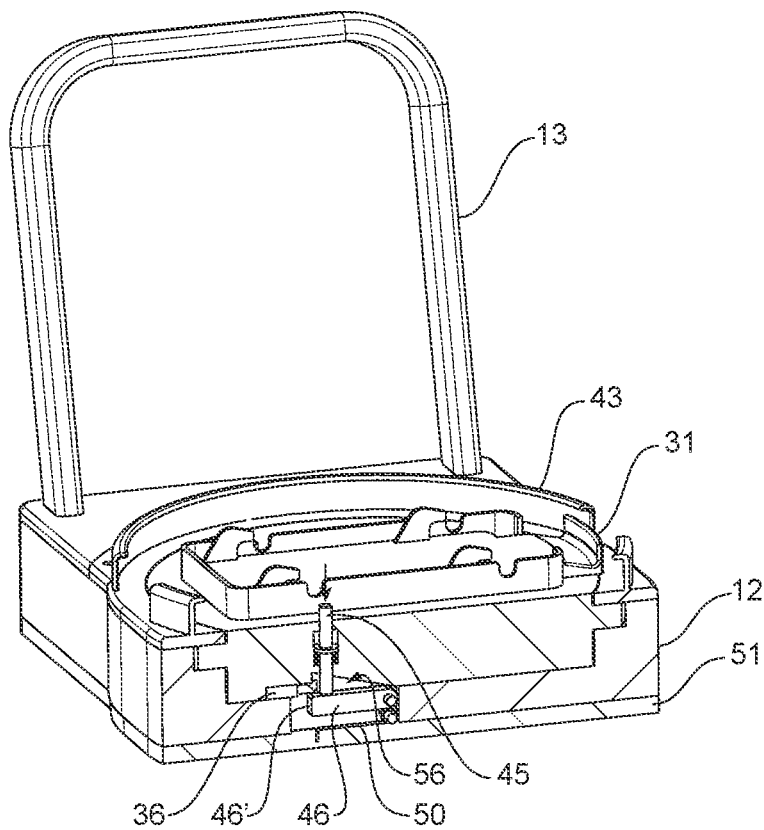
FIGS. 13 to 17 show a sequence of replacing a child seat onto the base (seat not shown for clarity) and operation of the actuating pins and latch bars.
Figure 14:
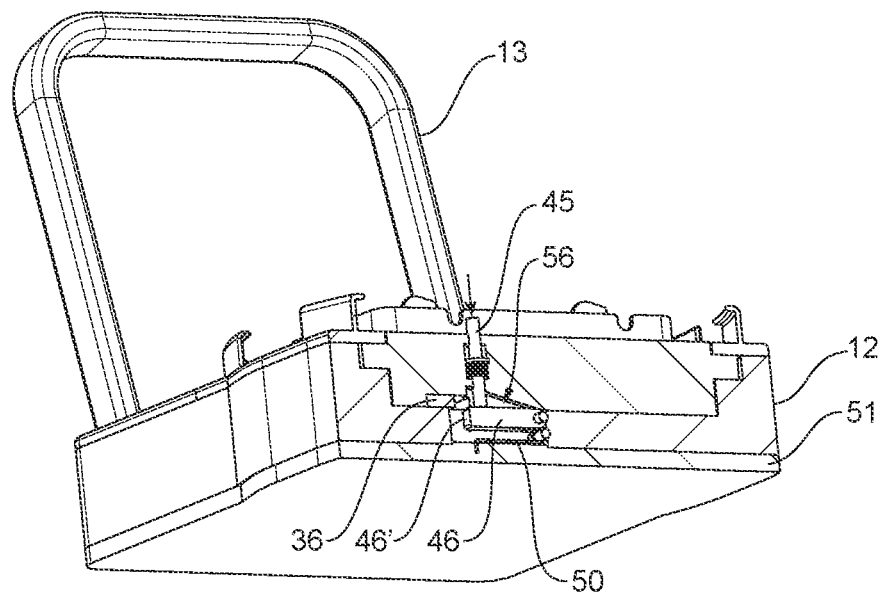
Figure 15:
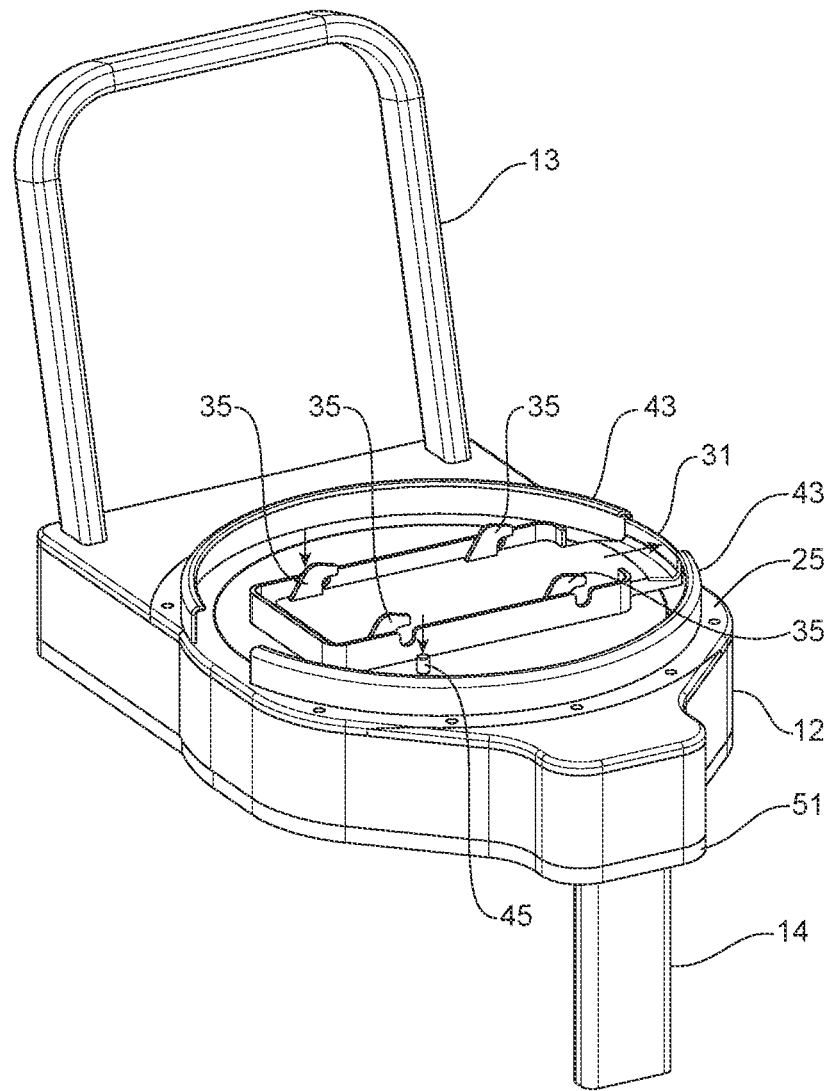
Figure 16:
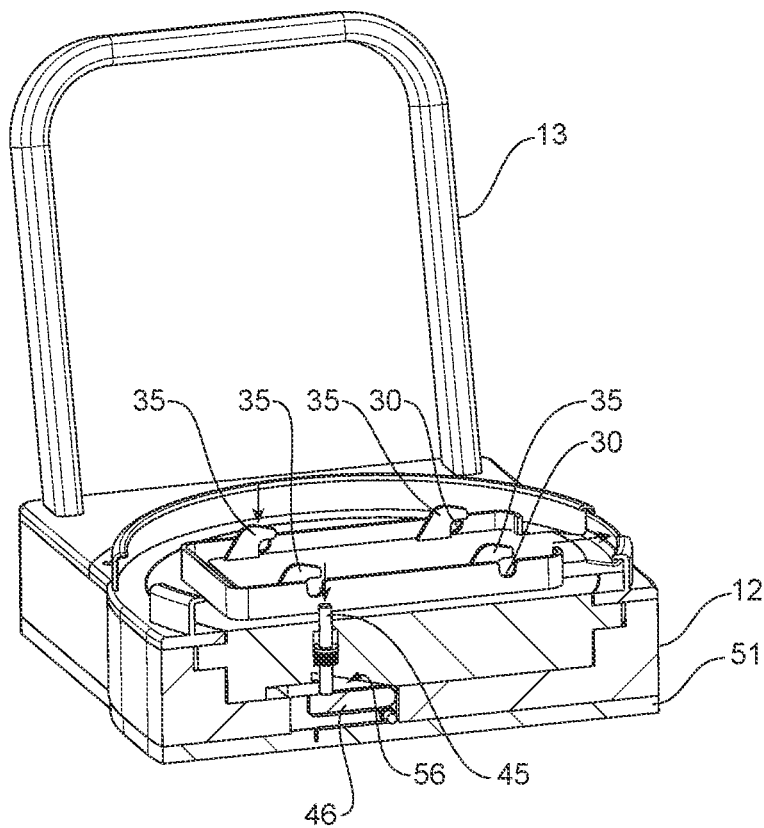
Figure 17:
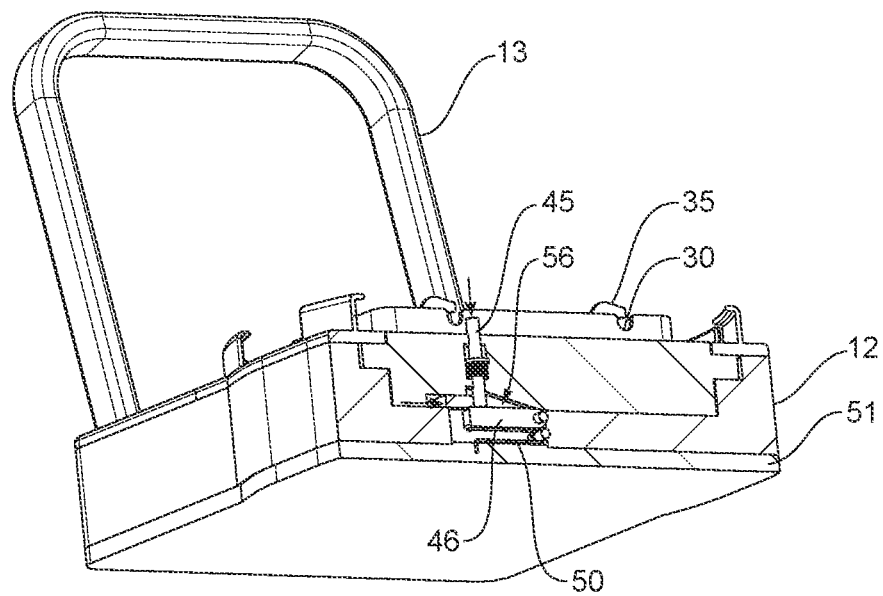

Upon replacing the seat 11 onto the base, the box 40 has interlock pins 58, visible in FIG. 12, that, as the pins 41 locate into the notches 30, press against the top of the actuating pins 45 and press them downwardly. This is against the biasing of springs 52. The lower ends of the actuating pins 45 press the respective latch bars 46 down so that, as seen in FIG. 12, the top surface of the latch bars 46 are level with the base of the rotary element 18. This also results in the end of the latch bar 46 being clear of the slots 56.

In this position, the latch body 20 can be moved to the latched position with the hooks 35 again locating over the pins 41. With the latch bars 46 in their lower position, the lugs 36 are now able to move over the latch bars 46 as seen in FIG. 12.

With the latch bars 46 below the base of the rotary element 18 and the seat 11 again latched to the base 12, the rotary element 18 and seat 11 are free to rotate away from a 90 degree position into an in-use position where it is latched in place.

While in the embodiment illustrated in FIGS. 1 to 17 interlock pins 58 are described separately from hook-engagable pins 41, in some embodiment the same extended pin will serve the function of both interlock pins 58 and hook-engagable pins 41.

Turning now to FIGS. 18 to 24, an alternative child safety seat and base combination is shown. In the exploded view of FIG. 18, the seat 11 and its box 40 are the same, or largely the same as those shown in FIG. 6. However the rotary element 18 and the seat latch are different. With this embodiment, two pairs of hooks 35 face each other as is shown more clearly in FIGS. 20A and 20B. This provides a reduced vulnerability against acceleration or deceleration as compared to an arrangement of hooks 35 that all face in the same direction as shown in FIGS. 1 to 17. The arrangement shown in FIGS. 20A and 20B therefore may provide better resistance to unwanted release in the event of a frontal or rearward impact in a motor vehicle accident.

Figure 18:
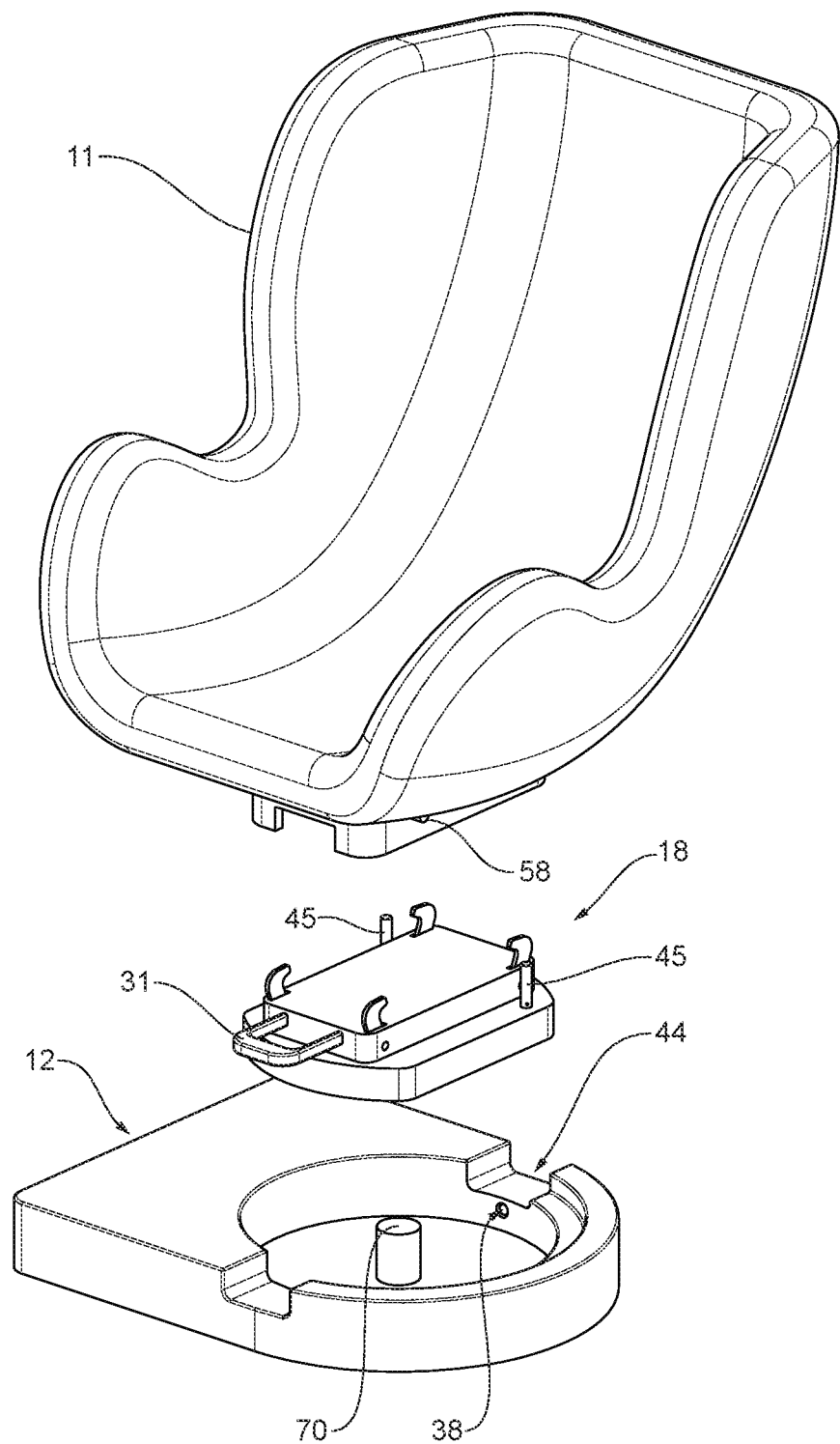
FIG. 18 shows an exploded view from above (upper exploded view) of an alternative child safety seat and base.
Figure 19:
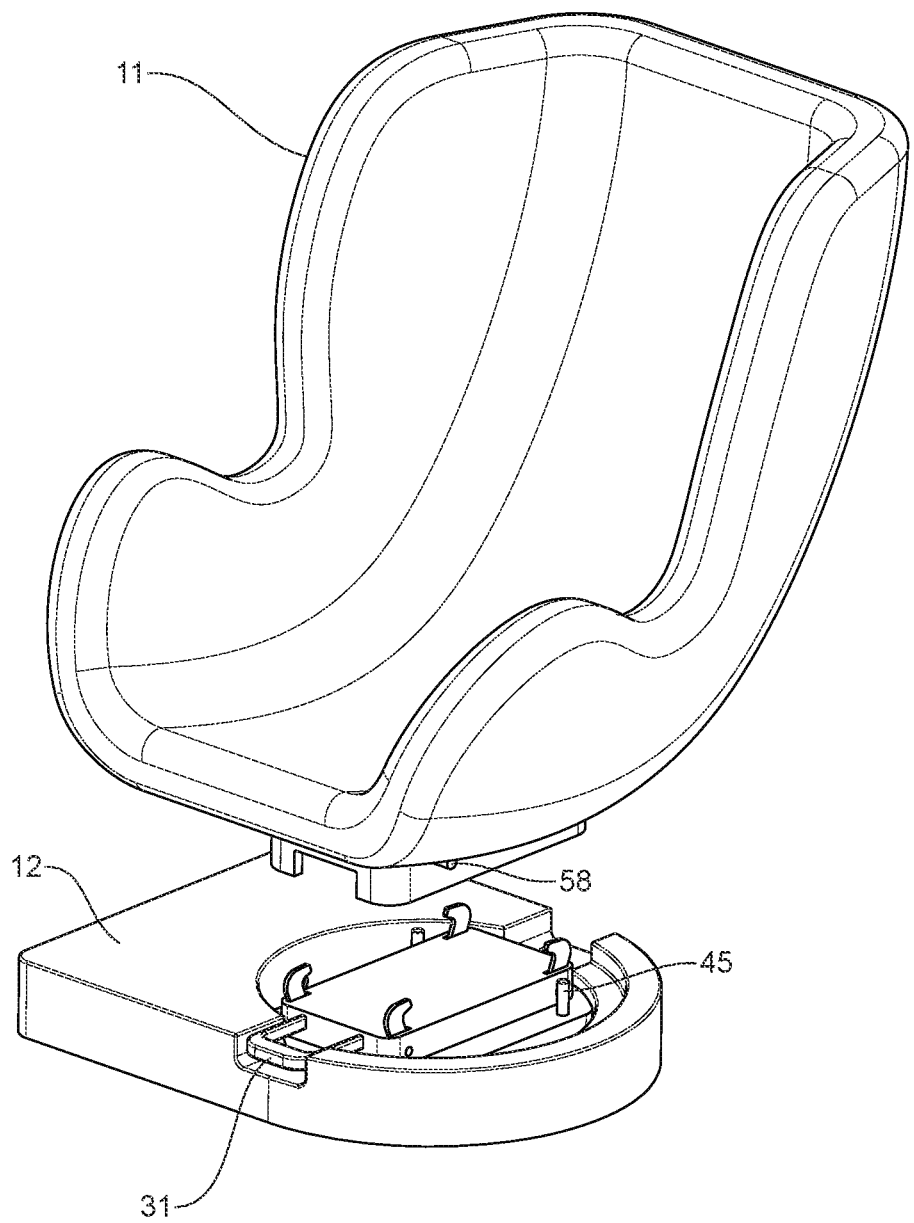
FIG. 19 shows an isometric view of the child safety seat and base of FIG. 18 with the seat detached from the base.

FIGS. 18 and 19 show a child safety seat 11 and base 12 assembly wherein a base 11 is arranged to be secured with respect to a motor vehicle and a seat is arranged to be removably secured with respect to the base. The assembly includes a rotary element 18, rotatably mounted to the base (most clearly shown in FIG. 19). The child seat 11 is securable to the rotary element 18 and together, the child seat 11 and rotary element 18 are able to rotate about a substantially vertical axis on the base 12. A pivot bearing support 70 on the base 12 is shown in FIG. 18. A corresponding attachment feature (not shown) is provided on the underside of the rotary element 18 thereby providing the substantially vertical axis.

Figure 24:
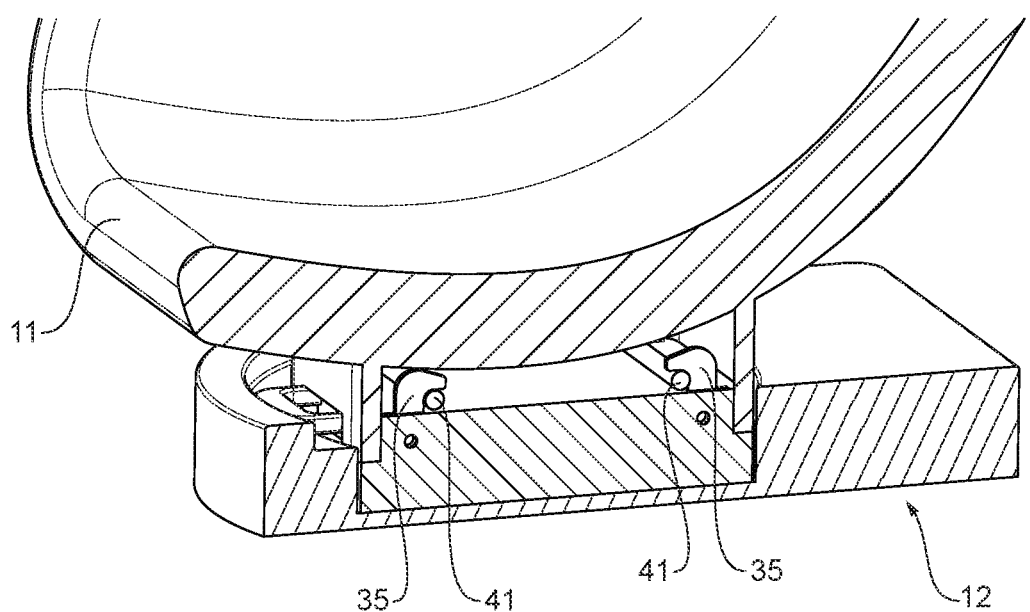
FIG. 24 is a partial cutaway isometric view of a portion of the safety seat and base shown in FIGS. 18 and 19, FIGS. 25A and 25B are diagrammatic views of a pull-release mechanism within the rotary element of FIGS. 20A and 20B, and FIGS. 26A and 26B are diagrammatic views of a push-release mechanism within the rotary element of FIGS. 20A and 20B.

A seat latch is provided on the rotary element that engages the child safety seat to releasably hold the child safety seat with respect to the base and rotary element. The seat latch includes a plurality of hooks 35 and hook-engagable projections 41 as shown in FIG. 24. In the embodiment illustrated in FIG. 24, it can be seen that the hook-engagable projections are in the form of hook engagable pins 41.

Figure 20A:
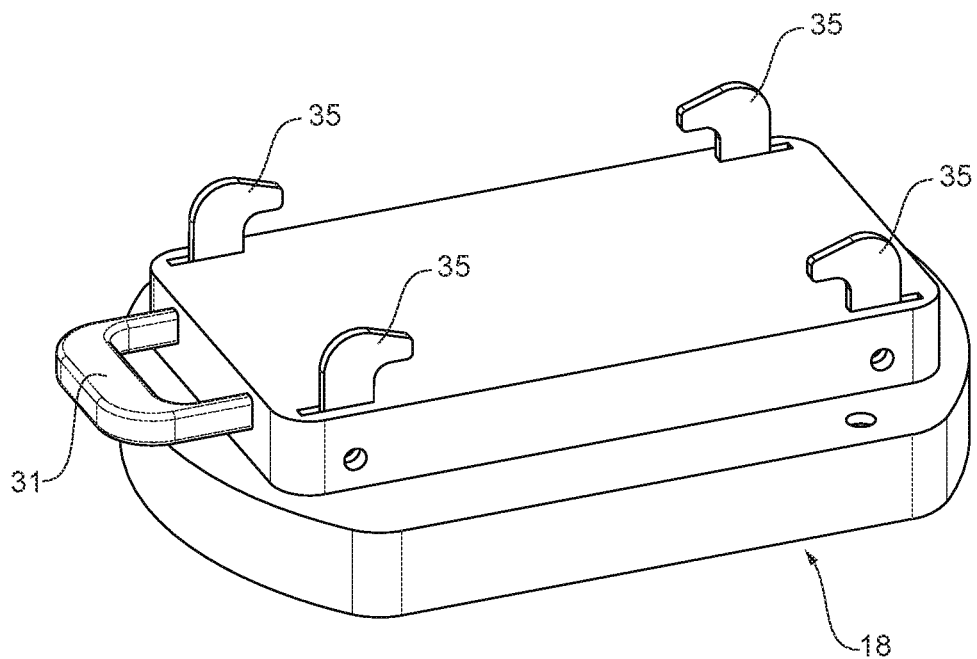
FIGS. 20A and 20B show isometric views of a pull-release rotary element of the base of FIGS. 18 and 19 in a locked and released position respectively.
Figure 20B:
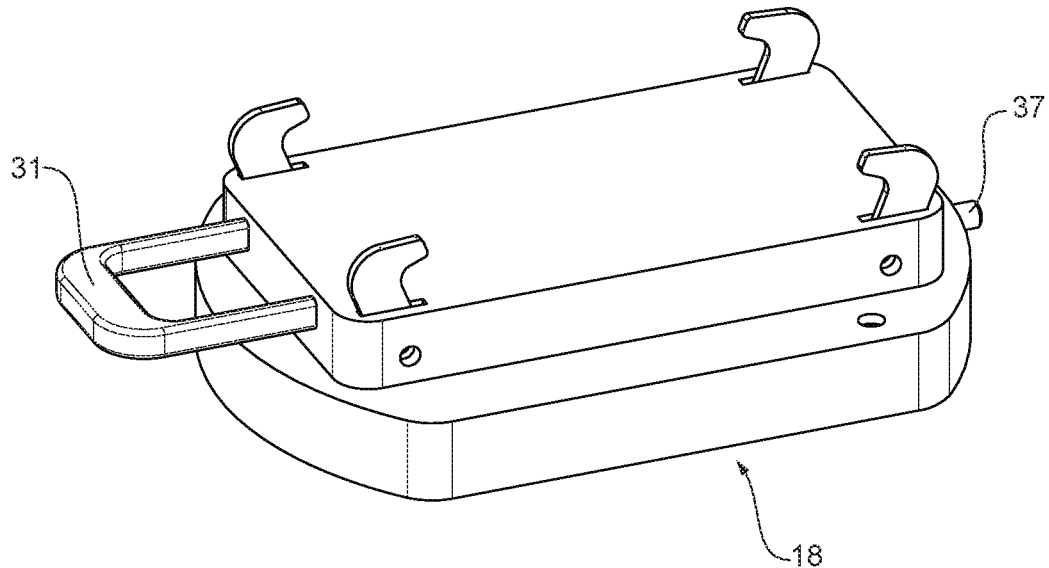
Figure 21A:
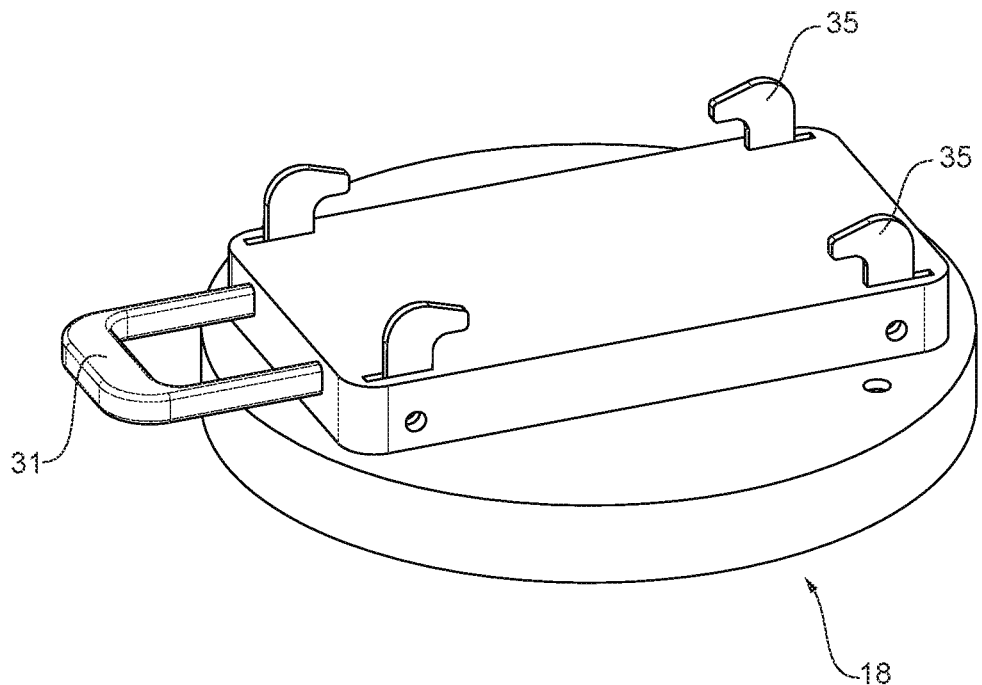
FIGS. 21A and 21B show isometric views of an alternative rotary element of the base of FIGS. 18 and 19 in a locked and released position respectively, this alternative having a push-release instead of a pull-release.
Figure 21B:
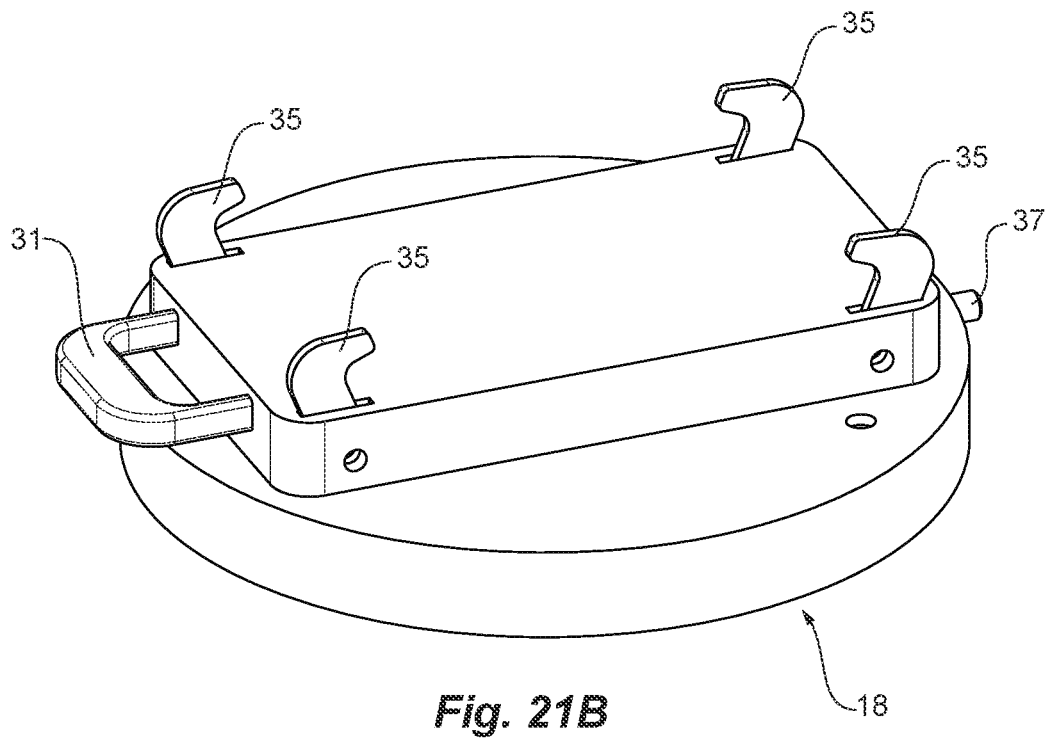

The hooks 35 are movable from a latching position in which they hold the hook-engagable projections, as shown in FIGS. 20A and 21A, to a released position in which they do not hold the projections, as shown in FIGS. 20B and 21B.

FIGS. 20A and 20B on the one hand, and FIGS. 21A and 21B on the other hand, show alternative arrangements. With the arrangement of FIGS. 20A and 20B, a pull-release mechanism within the rotary element is provided. In contrast, with the arrangement of FIGS. 21A and 21B, a push-release mechanism within the rotary element is provided.

Referring to FIGS. 18, 19, 22 and 23, it can be seen that the base 12 blocks access to the handle 31 when the seat 11 is in any position other than one or two side-loading position, thereby preventing opening or closing the seat latch when the seat is in any position other than side-loading position(s). For example, when in the driving position illustrated in FIG. 23, it is impossible for a user to access and actuate the handle 31. This prevents inadvertent or unsafe release of the hooks 35 from their securing positions shown in FIG. 24 for instance.

The assembly further includes a seat latch actuation assembly for opening or closing the seat latch wherein opening the seat latch releases the child safety seat. The seat latch actuation assembly includes a handle 31 slidably mounted with respect to the rotary element.

Referring now to FIGS. 18, 20B and 21B, an interlock mechanism, actuated upon opening the seat latch, is shown. The interlock mechanism prevents rotation of the rotary element 18 with respect to the base 12. The interlock mechanism includes a locking projection, in the form of a pin 37 and a locking recess, in the form of an aperture 38. The pin 37 is engagable with the aperture 38 to prevent rotation of the rotary element 18 with respect to the base 12 when the seat latch is opened.

The pin 37 extends from the rotary element 18 when the hooks 35 are open as can be seen in FIGS. 20B, 25B, 21B and 26B.

The aperture 38 is formed in the base 12 as is shown in FIG. 18.

Figure 22:
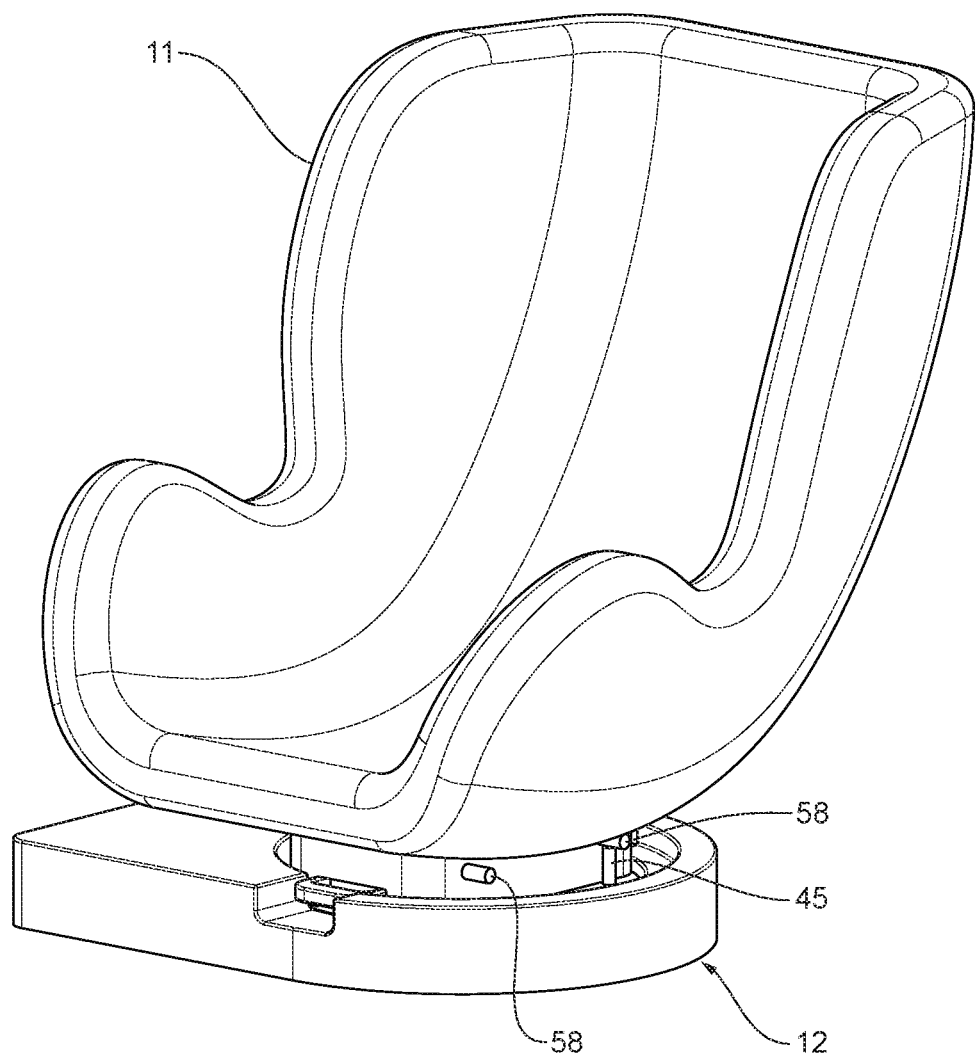
FIGS. 22 and 23 show isometric views of the safety seat and base shown in FIGS. 18 and 19 having the pull release of FIGS. 21A and 21B in a loading and a locked position respectively.
Figure 23:
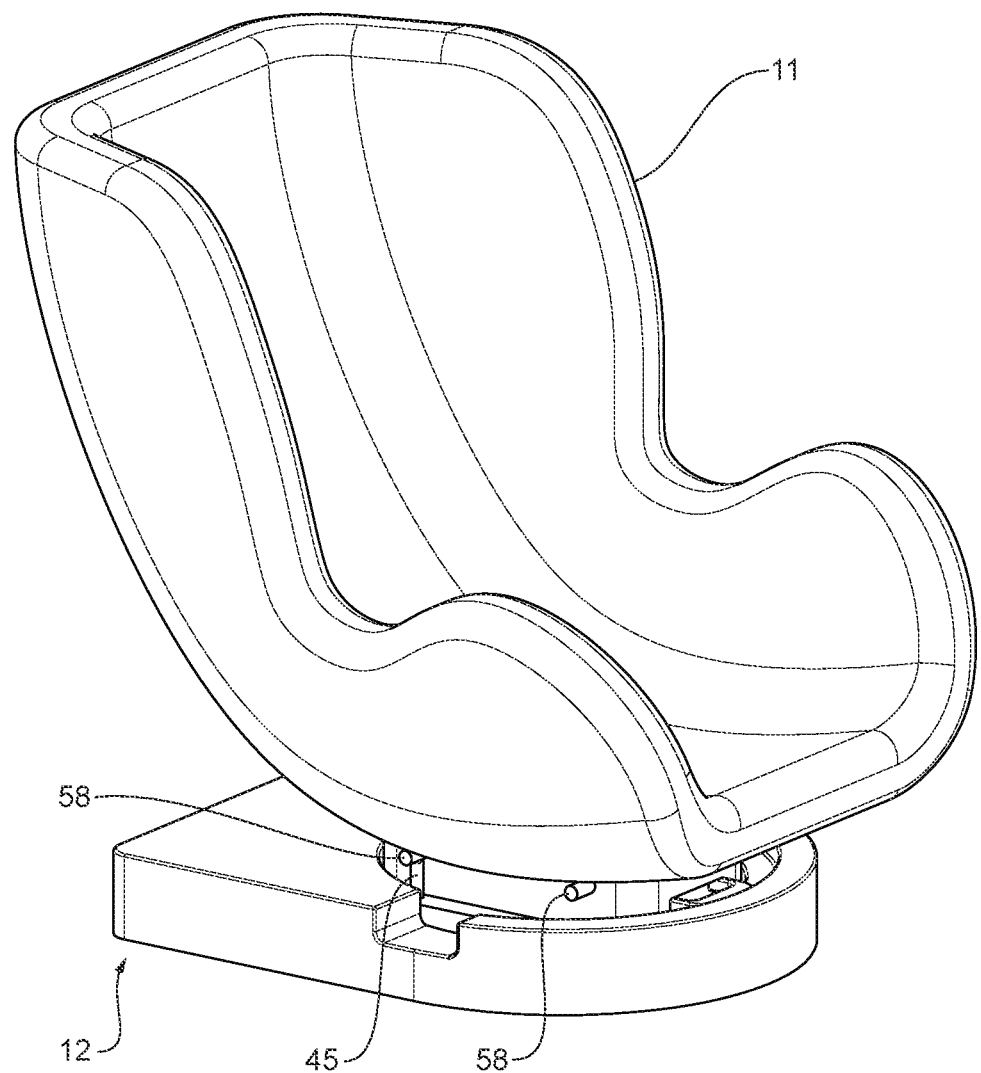

The rotary element 18 includes a depressable element in the form of an actuating pin 45 as shown in FIGS. 18 and 19. Multiple actuating pins 45 may be provided as is more clearly shown in the first embodiment of the invention as is illustrated in FIG. 8 for instance. The pins 45 are engagable by a seat-depending surface in the form of an interlock pin 58, or pins 58, as are shown in FIG. 22. In the embodiment illustrated, the depressible pins 45 are depressible by the pins 58 on the seat to release the interlock mechanism.

As with the first embodiment described above, the depressible interlock pin or pins 45 are biased toward an upper position in which the interlock mechanism locks, thereby preventing rotation of the rotary element 18 with respect to the base 12. Furthermore the interlock mechanism includes an interlock latch 46, the interlock latch is actuated by the interlock pin 45 as is illustrated in FIGS. 9 and 10. The interlock latch 46 is biased towards an upper position in which an end face 46' of the interlock latch 46 blocks movement of the handle 31, thereby preventing deactivation of the interlock mechanism until the interlock pin 45 is depressed. As can be seen in FIGS. 8 and 9, the interlock latch is pivotally mounted to the rotary element 18.

Various internal mechanisms can be provided within or on the rotary element 18 to provide the functionality of the seat latch actuation and interlock mechanisms. These mechanisms may be separate or integrated as is shown by the non-limiting examples of FIGS. 25A and 25B and in the alternatives of FIGS. 26A and 26B.

Figure 25A:
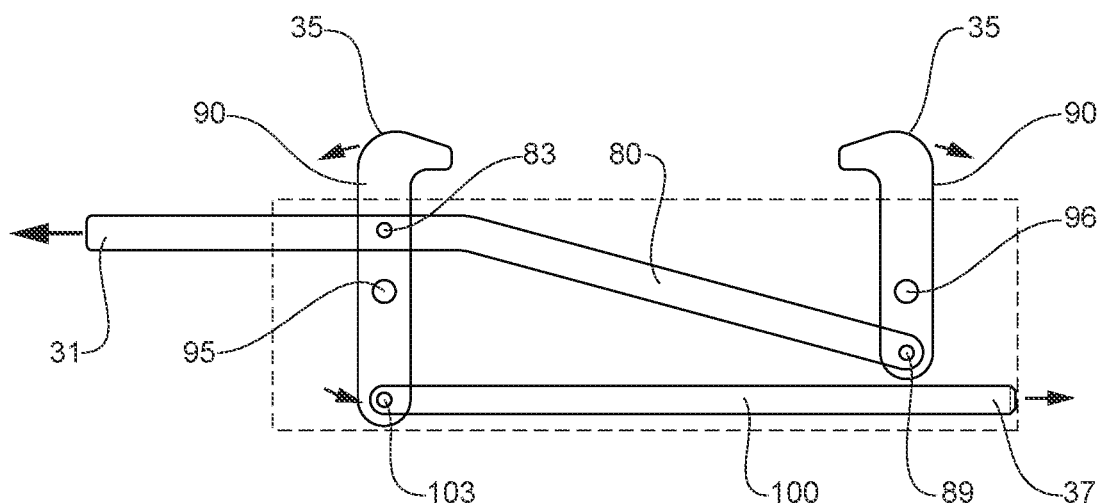
Figure 25B:
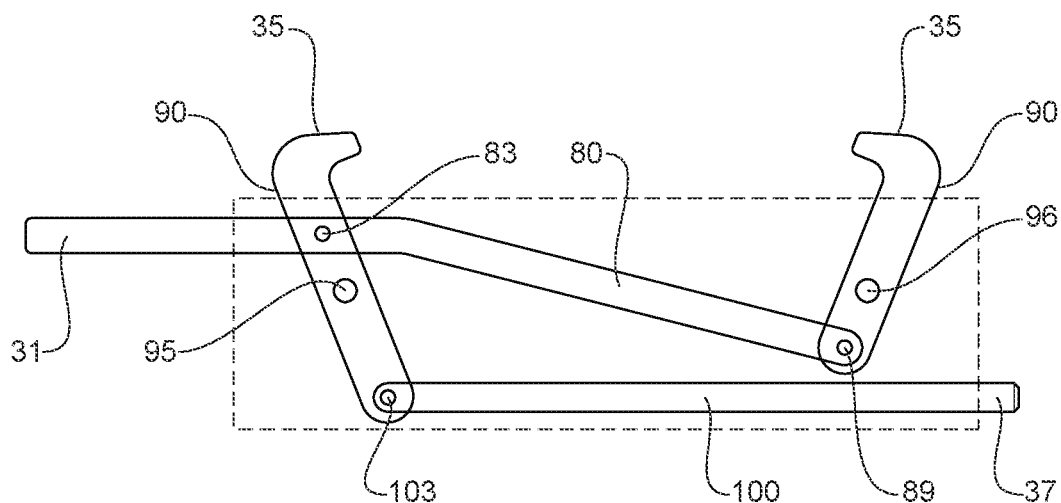

Referring to FIGS. 25A and 25B, it can be seen that a handle linkage 80, that is either operatively connected to the handle 31 or forms part of the handle 31, is pivotally connected to a pair hook linkages 90 at pivot points 95 and 96. This arrangement is the pull-release mechanism within the rotary element 18 shown in FIGS. 20A and 20B respectively.

Figure 26A:
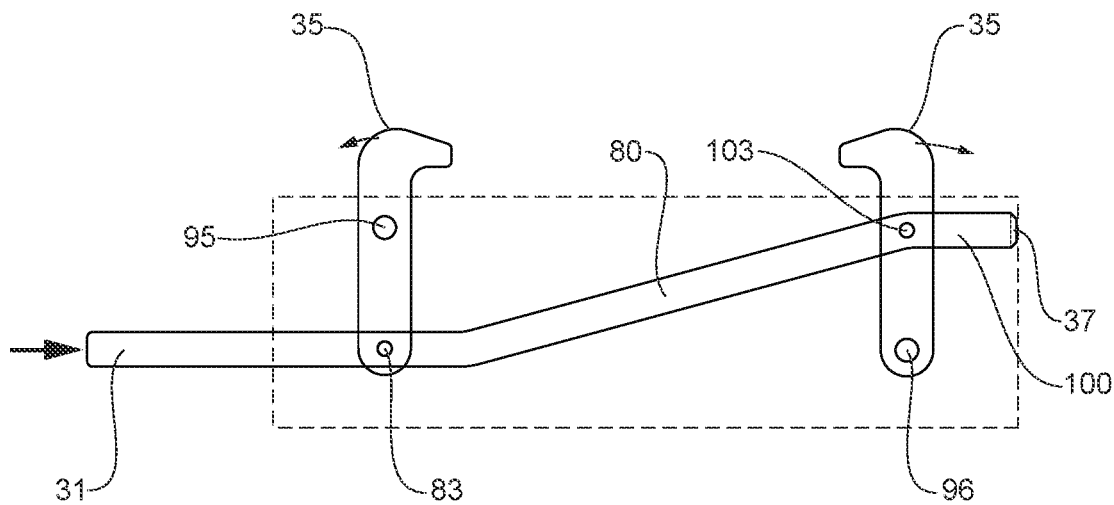
Figure 26B:
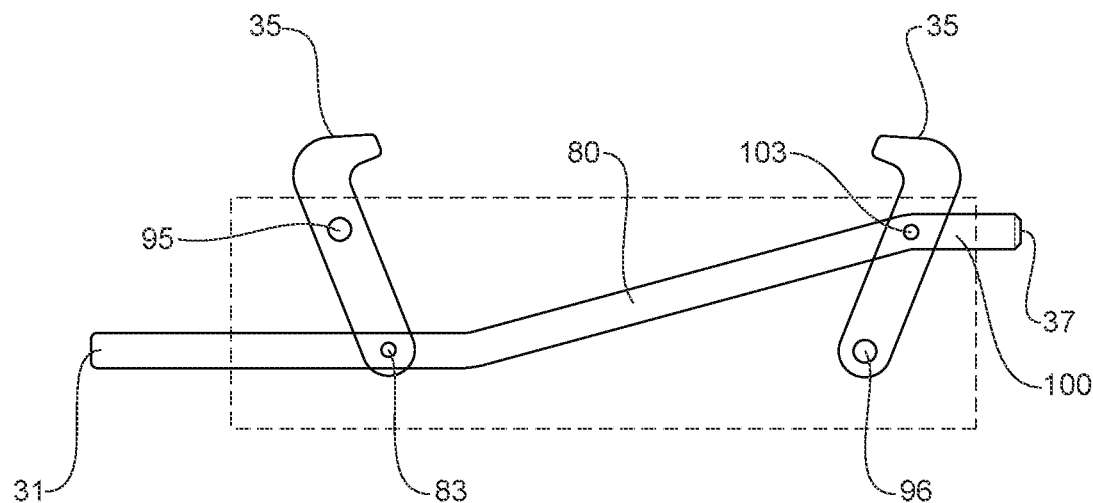

Referring to FIGS. 26A and 26B, a similar arrangement to that of FIGS. 25A and 25B is shown. However the arrangement is the push-release mechanism within the rotary element 18 shown in FIGS. 21A and 21B respectively.

The operating of the actuating pins 45 and the latch bars 46 are shown sequentially in FIGS. 13 to 17. Starting at FIG. 13, placement of the seat 11 onto the base 12 (seat 11 not shown for clarity), results in the pins 58 depressing the actuating pins 45 which in turn push the latch bars 46 into their lower position (FIGS. 13 and 14) from their upper position shown in FIGS. 9 and 10. With the lugs 36 now no longer blocked by faces 46' on the ends of the latch bars 46, the latch body 20 moves to its latched position seen in FIGS. 15 to 17. The seat 11 is latched and the rotary element 18 is free to rotate.

FIGS. 11 to 17 show the seat 11 being removed from the right hand side of the base 12. The latch bars 46 are on the left side of the base 12 to allow the apertures 56 to align in this position. A further set of latch bars 46 would need to be provided on the right side of the base 12 in order to allow removal of the seat 11 from the left side of the base 12. These have not been drawn, but it will be apparent to a skilled addressee as to the required location of these additional latch bars 46.

As can be seen from the above description, the described embodiment provides a means of rotating a seat 11 to a 90 degree position and for it to be removed from a base 12 only when in that position. Further, interlocks are provided that prevent the rotary element 18 moving while the seat 11 is removed. This prevents the seat 11 being removed when in a position other than the pre-determined position and ensures the seat 11 is repositioned in the correct orientation on the base. It also prevents the rotary element 18 moving out of position while the seat is removed.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A child safety seat and base assembly wherein a base is arranged to be secured with respect to a motor vehicle and a seat is arranged to be removably secured with respect to the base, the assembly including:
   a rotary element rotatably mounted to the base;
   a seat latch on the rotary element that engages the child safety seat to releasably hold the child safety seat with respect to the base and rotary element;
   a seat latch actuation assembly for opening or closing the seat latch wherein opening the seat latch releases the child safety seat; and
   an interlock mechanism actuated upon opening the seat latch that prevents rotation of the rotary element with respect to the base;
   wherein the interlock mechanism includes a locking projection and a locking recess, the locking projection engagable with the locking recess to prevent rotation of the rotary element with respect to the base when the seat latch is opened;
   wherein the locking projection extends from the rotary element and the locking recess is formed in the base.

2. The child safety seat and a base as claimed in claim 1, wherein the seat latch actuation assembly includes a handle slidably mounted with respect to the rotary element.

3. The child safety seat and a base as claimed in claim 1, wherein, in use, the base blocks access to a handle when the seat is in any position other than one or two side-loading position(s), thereby preventing opening or closing the seat latch when the seat is in any position other than the one or two side-loading position(s).

4. The child safety seat and a base as claimed in claim 3 including a plurality of hooks and hook-engagable projections, wherein the hooks are located on the rotary element and form part of the seat latch and the hook-engagable projections are located on the seat.

5. The child safety seat and a base as claimed in claim 1 including a plurality of hooks and hook-engagable projections, the hooks movable from a latching position in which they hold the hook-engagable projections, to a released position in which they do not hold the projections.

6. The child safety seat and a base as claimed in claim 1, wherein the rotary element includes a depressible element engagable by a seat-depending surface,
   whereby the depressible element is depressible by the seat-depending surface to release the interlock mechanism.

7. The child safety seat and a base as claimed in claim 6, wherein the depressible element includes an interlock pin, the interlock pin biased toward an upper position in which the interlock mechanism locks, thereby preventing rotation of the rotary element with respect to the base.

8. The child safety seat and a base as claimed in claim 7, wherein the interlock mechanism includes an interlock latch, the interlock latch actuated by the interlock pin.

9. The child safety seat and a base as claimed in claim 8, wherein the interlock latch is biased towards an upper position in which an end face of the interlock latch blocks movement of the handle, thereby preventing deactivation of the interlock mechanism until the interlock pin is depressed.

10. The child safety seat and a base as claimed in claim 9, wherein the interlock latch is pivotally mounted to the rotary element.

* * * * *